US005777262A

United States Patent [19]
Nourai et al.

[11] Patent Number: 5,777,262
[45] Date of Patent: Jul. 7, 1998

[54] APPARATUS AND METHOD FOR INCREASING ELECTRICAL CLEARANCES OF ENERGIZED CONDUCTORS

[75] Inventors: Ali Nourai, Dublin; Albert J. F. Keri, Columbus; Ronald Marsico, Worthington, all of Ohio

[73] Assignee: AEP Energy Services, Inc., Columbus, Ohio

[21] Appl. No.: 687,715

[22] Filed: Jul. 26, 1996

[51] Int. Cl.[6] ............................................. H02G 7/00
[52] U.S. Cl. ............................................. 174/40 R
[58] Field of Search ........................... 174/149 R, 146, 174/148, 150, 43, 45 R, 154, 40 R, 144, 145, 160

[56] References Cited

U.S. PATENT DOCUMENTS

| | | | |
|---|---|---|---|
| 3,229,031 | 1/1966 | Owens et al. | 174/0 |
| 3,264,401 | 8/1966 | Lantz | 174/148 |
| 3,316,342 | 4/1967 | Cofer | 174/150 |
| 3,482,031 | 12/1969 | Ratenberg | 174/148 |
| 3,614,292 | 10/1971 | Volker | 174/148 |
| 3,647,933 | 3/1972 | Okada et al. | 174/43 |
| 4,523,054 | 6/1985 | Baker et al. | 174/45 R |

*Primary Examiner*—Kristine L. Kincaid
*Assistant Examiner*—Dhiru R. Patel
*Attorney, Agent, or Firm*—Sand & Sebolt

[57] ABSTRACT

An apparatus and method for increasing electrical clearances on power lines to increase the conductor to structure clearance and insulation length and the conductor clearance to ground and other underlying objects. The apparatus may be applied live-line and can be installed without significantly modifying existing support structure. A suspension insulator string extends vertically from the tower and a yoke plate is connected to the bottom thereof. First and second insulator strings extend outwardly in opposite directions from the yoke plate with a dead end strain clamp attached to an outer end of each insulator string. The dead end strain clamp of each insulator string, dead ends the electrical conductor forming an upgrade loop therebetween. A post insulator is rigidly mounted on the yoke plate and extends from the yoke plate to the conductor upgrade loop intermediate to the outer ends of the first and second insulator strings. The apparatus is installed by either re-using an existing vertical suspension insulator string from the support structure or replacing it with a similar insulator string, and mounting the apparatus of the present invention on this vertical insulator string. The conductor is tightened on one side of the tower and the dead end strain clamp of the first insulator string is clamped to the conductor, and the conductor is then tightened on the other side of the tower and the dead end strain clamp of the second insulator string is clamped to the conductor forming the conductor upgrade loop therebetween.

21 Claims, 3 Drawing Sheets

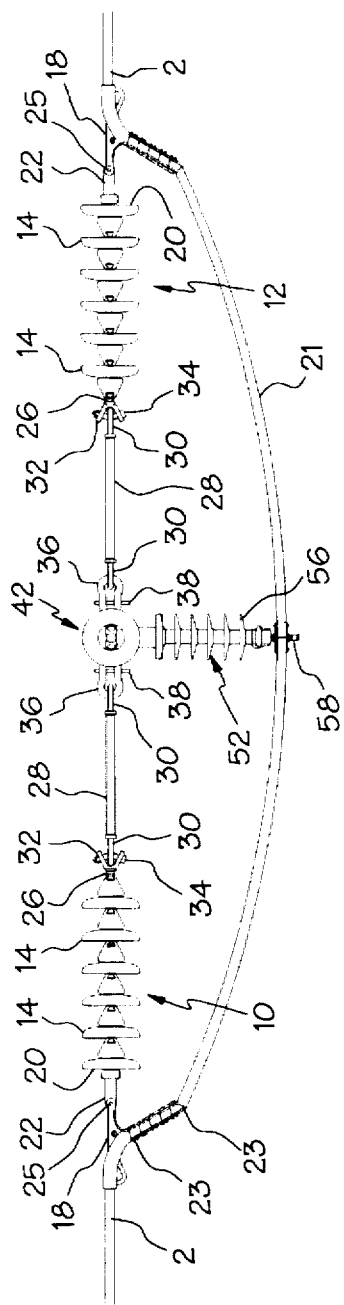

APPARATUS AND METHOD FOR INCREASING ELECTRICAL CLEARANCES OF ENERGIZED CONDUCTORS

BACKGROUND OF THE INVENTION

1. Technical Field

The invention relates to an apparatus and method for increasing the electrical clearances of energized conductors from their grounded supporting structures and underlying objects. More particularly, the invention relates to such an apparatus and method which includes a plurality of insulators which can be installed without modification to the existing support structures. The apparatus may be installed live line. Even more particularly, the invention relates to an apparatus and method which forms an outwardly extending conductor loop which increases the clearance between the electrical conductor and its support structure, which is able to shorten the catenary length of the conductor between adjacent support structures to increase the clearance between the conductor and the ground and between the conductor and other underlying objects, and which has an increased insulation length.

2. Background Information

Electric companies often wish to upgrade the line voltage to its customers or to certain areas which require additional power. For example, electric companies will upgrade a 138 kV line to 230 kV to strengthen its network for more power flow and energy sales in needed areas. In recent years, electric companies have utilized existing transmission lines and rights of way when upgrading the line voltage to avoid the cost of building additional lines. Utilizing these existing transmission lines poses several technical aspects that must be considered. First, the minimum required clearance between the electrical conductor and the tower or support structure increases as the voltage on the conductor increases. If these minimum clearances are not met, the increased voltage on the conductor will cause arcing between the conductor and the support structure or tower. Second, the minimum required clearance between the conductor and the ground or other underlying objects is greater for lines carrying higher voltage. The catenary sag of the conductor extending between adjacent support structures must be raised approximately 2 to 3 feet when the voltage is upgraded, for example from 138 kV to 230 kV. Third, the support structures suspend the electrical conductors using a vertical string of suspension insulators. The insulation length, determined by the insulation requirement, must be increased when the voltage on the conductor is raised. Also, electric companies often want to improve the electrical performance of lines by increasing the insulation length or conductor clearances.

Conventional apparatuses and methods used to increase the conductor to tower clearance, the conductor to ground clearance and the insulation length often require expensive and time consuming tower modifications. The existing insulators have to be removed from the support structure and the power line must be taken out of service for extended periods of time during the tower modification and installation of the prior art methods. The electric companies must pay work crews to modify the support structures to implement existing methods, they must also pay for any additional equipment needed to modify the support structures, and they lose energy sales during the long period that the power line is taken out of service.

Therefore, the need exists for an apparatus and method for increasing electrical clearances between a conductor and its support structure which has an increased insulation length, and between the conductor and the ground, which can be mounted on existing electrical towers without significant modification thereto, and which may be installed live-line requiring no service interruption to the electric company's customers. There is no such apparatus and method of which we are aware that accomplishes these results.

SUMMARY OF THE INVENTION

Objectives of the present invention include providing an improved method and apparatus for increasing electrical clearances and insulation-between the conductor and the support structure, and between the conductor and the ground and other underlying objects. This technique requires no significant modifications to existing electrical towers or support structures.

Another objective is to provide such a method and apparatus which may be applied live-line to minimize the interruption of the power flow and service to the electric company's customers.

A further objective is to provide such a method and apparatus which includes first and second insulator strings attached at first ends to the electrical conductor and extending substantially in-line with the conductor, and which form an outwardly extending conductor upgrade loop between the first ends of the insulator strings.

Still another objective is to enable new transmission lines to be constructed with smaller towers than heretofore possible with existing conductor attachment apparatus and methods.

Another objective of the invention is to provide such a method and apparatus which uses various standard hardware items arranged in a novel configuration which can be assembled before being mounted on the support structure.

Another objective of the invention is to provide such a method and apparatus for improving existing line performance against voltage disturbances and insulator contamination.

A further objective of the invention is to provide such a method and apparatus which utilizes existing transmission lines and rights of way for increasing the power transfer through the existing electrical conductors.

These objectives and advantages are obtained by the improved apparatus of the present invention, the general nature of which may be stated as including first and second insulators dead-end clamped at first ends to the electrical conductor and extending substantially in line with said conductor, a section of said conductor forming an outwardly extending upgrade loop between the first ends of said first and second insulators; attachment means for mounting said first and second insulators on the support structure at second ends of the insulators; and a third insulator adapted to extend from the attachment means for maintaining the upgrade loop a predetermined distance from the support structure.

These objectives and advantages are obtained by the improved method of the present invention, the general nature of which may be stated as including disconnecting the conductor from the support structures; mounting attachment means to said support structure; attaching first and second insulator strings to said attachment means; and dead-ending the conductor at spaced locations to the insulator strings on opposite sides of the attachment means to form a conductor loop extending between said insulator strings.

BRIEF DESCRIPTION OF THE DRAWINGS

The preferred embodiments of the invention, illustrative of the best modes in which applicants have contemplated applying the principles, are set forth in the following description and are shown in the drawings and are particularly and distinctly pointed out and set forth in the appended claims.

FIG. 2 is an enlarged fragmentary top plan view of the apparatus of FIG. 1 removed from the tower;

FIG. 3 is an elevational view of the apparatus of FIG. 2;

FIG. 4 is a side sectional view looking in the direction of arrows 4—4, FIG. 3;

Similar numerals refer to similar parts throughout the drawings.

DESCRIPTION OF THE PREFERRED EMBODIMENTS

Figure 1:
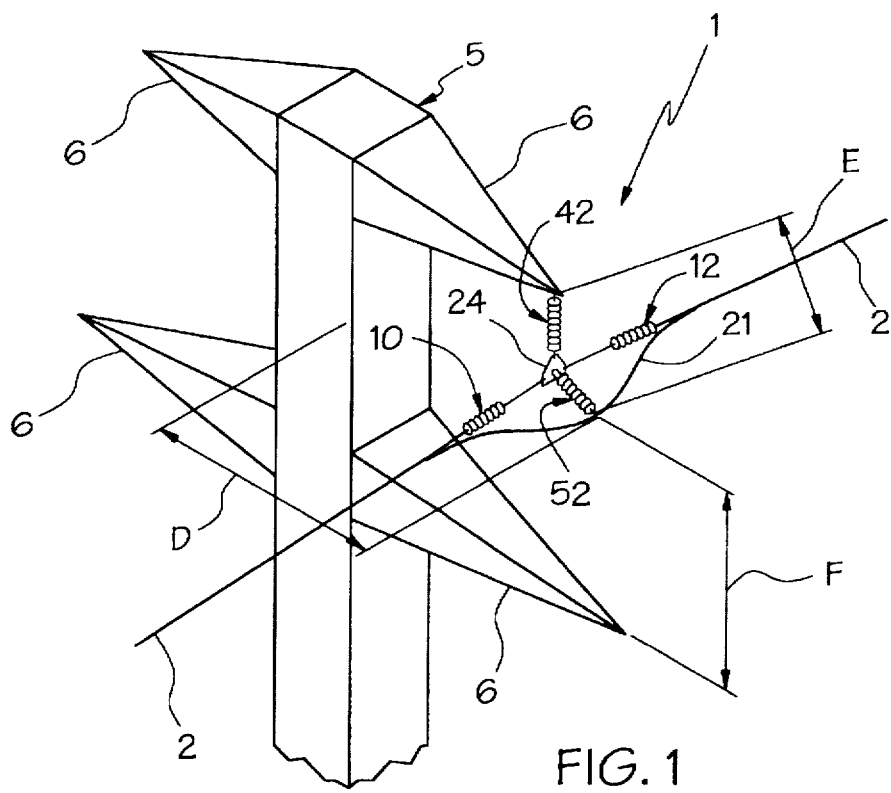
FIG. 1 is a diagrammatic perspective view showing a first embodiment of the apparatus and method for upgrading electric power lines of the present invention.
Figure 8:
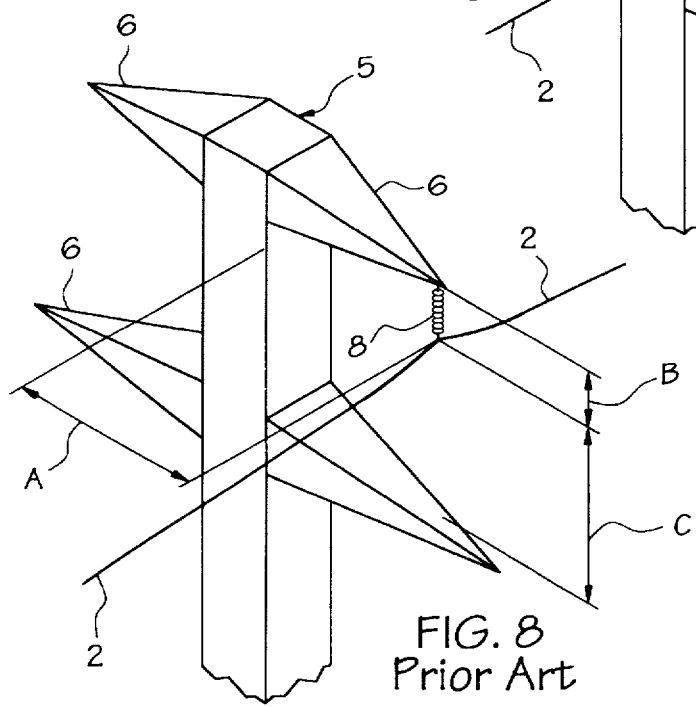
FIG. 8 is a diagrammatic perspective view of a prior art suspension insulator string used to support the electrical conductor prior to being upgraded by the method and apparatus of the present invention.

The apparatus for increasing electrical conductor clearance is indicated generally at 1 in FIG. 1, and is shown supporting a usual electrical conductor or power transmission line 2. Apparatus 1 is shown attached to a usual support structure or electrical tower 5 which includes a plurality of outwardly extending support arms 6. Apparatus 1 can utilize the existing suspension insulator string 8 (FIG. 8) when the voltage through conductor 2 is upgraded, for example, from 138 kV to 230 kV. Suspension insulator string 8 suspends conductor 2 a horizontal distance "A" from support structure 5, a vertical distance "B" from arm 6 of support structure 5, and a vertical distance "C" from the underlying support arms 6. Distances A, B and C must be increased when the voltage through conductor 2 is upgraded to prevent arcing and circuit de-energization between the conductor and the support structure and to meet certain minimum clearance requirements. Further, the catenary length of conductor 2 which extends between adjacent support structures 5 must be raised approximately 2–3 feet when the voltage is upgraded for example, from 138 kV to 230 kV to provide sufficient clearance from the ground and other underlying objects. Conductor 2 is shown in FIG. 8 connected to suspension insulator string 8 and is attached to the bottom thereof by a usual suspension clamp (not shown).

In accordance with one of the features of the invention, apparatus 1 is shown particularly in FIGS. 2–4, and includes first and second insulator strings 10 and 12, respectively. Insulator strings 10 and 12 are of the usual suspension type of insulators as insulator string 8 of FIG. 8, and include a plurality of interconnected ball and socket disc insulators 14. A dead end strain clamp 18 is mounted to a first end 20 of each insulator string 10 and 12 by a socket eye 22. Clamps 18 dead end conductor 2 at first ends 20 of insulators strings 10 and 12 and form a conductor upgrade loop 21 therebetween. Dead end strain clamps 18 preferably are constructed from lightweight, high strength aluminum alloy, commercially available, and include keeper piece (not shown) and a plurality of U-bolts 23 which extend around and clamp conductor 2 to clamps 18. Socket eyes 22 extend into the devises of clamps 18 and are secured therein by a pin and cotter key assembly 25. Socket eyes 22 preferably are constructed of a hot dipped galvanized ductile iron which are commercially available.

A triangular yoke plate 24 is positioned intermediate first and second insulator strings 10 and 12, respectively, and is connected to a second end 26 of each insulator string 10 and 12 by a chain eye/chain eye hot line extension link 28. Extension links 28 include an oval-shaped chain eye 30 on each end thereof, and preferably are forged from a high-strength steel protected by a heavy coating of hot-dip galvanizing, such as those available commercially. A ball Y-clevis 32 extends from second end 26 of each insulator string 10 and 12 and includes a curved bolt, nut and cotter key assembly 34 which extends through one chain eye 30 to attach extension links 28 to insulator strings 10 and 12. A generally U-shaped anchor shackle 36 preferably manufactured from a galvanized steel, extends through the other chain eye 30 of extension link 28 and includes a nut and bolt assembly 38 which attaches the anchor shackle to yoke plate 24, orienting the plane of yoke plate 24 and the balance of the insulator hardware.

A vertical suspension insulator string 42 extends upwardly from the top of yoke plate 24 to support apparatus 1 from support structure 5 as described below. Insulator string 42 includes a plurality of usual interconnected disc insulators 43, which are similar to disc insulators 14 of insulator strings 10 and 12, and is attached to yoke plate 24 by a socket Y-clevis 44. Socket Y-clevis 44 includes a curved bolt, nut and cotter key assembly 46 which extends through an opening (not shown) formed in yoke plate 24 to attach insulator string 42 to the yoke plate. A ball Y-clevis 48 extends from the top of insulator string 42 and includes a curved bolt, nut and cotter key assembly 50, which attaches insulator string 42 to arm 6 of support structure 5.

A horizontal line post insulator 52 is rigidly mounted to the surface of yoke plate 24 and is angled outwardly and downwardly therefrom. Line post insulator 52 includes a plurality of rigidly connected porcelain insulator sections 56 and is attached to yoke plate 24 by an arm 54. A usual conductor clamp 58 is mounted on and extends from the outer free end of line post insulator 52 and connects line post insulator 52 to a center section of conductor upgrade loop 21. The extra conductor length, required to form the curved upgrade loop, may be utilized to remove conductor length from the adjacent spans and thereby raise the conductors in the spans and may not require the splicing or addition of any additional cable thereto.

Apparatus 1 is used to increase the electrical conductor clearances between conductor 2 and support structure 5, between conductor 2 and the ground and other underlying objects, and to increase the insulation level. When carrying out the method of the present invention, conductor 2 is unclamped from vertical suspension insulator string 8 (FIG. 8) and insulator string 8 is reused or removed from support structure 5 and replaced with a similar insulator string. Apparatus 1 preferably is pre-assembled on the ground before being mounted to support structure 5 in the configuration described above and shown in FIGS. 2–4. Ball Y-clevis 48 connects vertical insulator string 42 to support arm 6 of support structure 5 (FIG. 1). Vertical insulator string 42 connects to support arm 6 in a manner similar to that of insulator string 8 and requires no modification to support arm 6 or support structure 5.

The tension in conductor 2 is increased and the conductor is dead-ended on insulator 10 (FIG. 1) which shortens the catenary length of conductor 2 extending between insulator 10 and the adjacent support structure which, in turn, increases the conductor to ground clearance. Dead end strain clamp 18 of insulator string 10 receives tightened conductor 2 and U-bolts 23 are tightened around conductor 2 to dead-end conductor 2 at first end 20 of first insulator string 10. The tension in conductor 2 is then increased on the insulator 12 side of support structure 5 to a tension substantially equal to that of the tension on insulator 10, and dead end strain clamp 18 of insulator string 12 receives tightened conductor 2. U-bolts 23 are tightened around conductor 2 to dead-end conductor 2 at end 20 of second insulator string 12 forming conductor upgrade loop 21 between first ends 20 of first and second insulator strings 10 and 12, respectively.

The shifted length of conductor 2 which is achieved from increasing the tension therein, with the resultant shortening of the catenary lengths thereof on both sides of structure 5, may provide the extra wire or conductor needed to form loop 21 eliminating in most instances, the need to splice additional wire in forming loop 21.

Conductor clamp 58 is attached to conductor upgrade loop 21 intermediate dead end strain clamps 18 and first and second insulator strings 10 and 12, respectively, which extend substantially in-line with conductor 2 on each side of support structure 5. Conductor 2 applies a substantially equal outward tension on insulator strings 10 and 12 with no tension applied to upgrade loop 21. Line post insulator 52 retains upgrade loop 21 of conductor 2 an increased distance "D" (FIG. 1) away from support structure 5 and increased distances "E" and "F" away from support arms 6. Tightening conductor 2 a specific amount on each insulator string 10 and 12 shortens the catenary length of conductor 2 on both sides of support structure 5 to provide the needed additional wire for loop 21.

Figure 5:
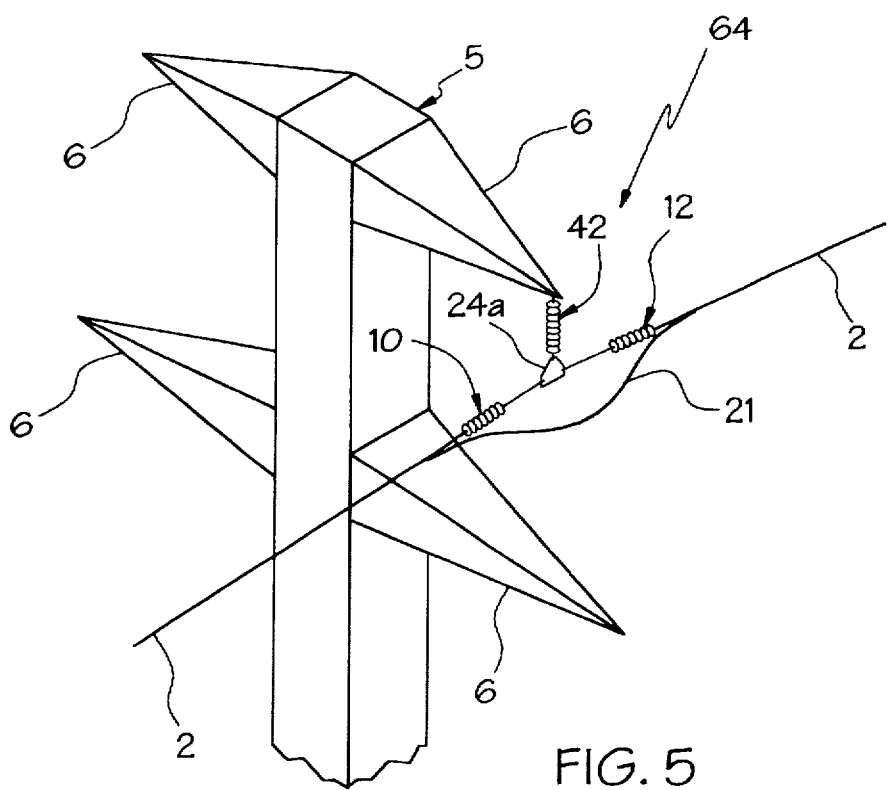
FIG. 5 is a diagrammatic perspective view of a second embodiment of the apparatus and method of the present invention.

A second embodiment of apparatus 1 is shown in FIG. 5 and indicated generally at 64. Apparatus 64 is similar to apparatus 1 and includes first and second insulator strings 10 and 12, vertical insulator string 42 and a yoke plate 24a which is generally similar to yoke plate 24. Apparatus 64 is free of line post insulator 52 which extends between yoke plate 24a and conductor loop 21 of apparatus 1. Conductor 2 of FIG. 5 is of a substantially rigid material in order to create a stiff loop between dead end clamps 18 of insulator strings 10 and 12 which prevents upgrade loop 21 from bending downward eliminating the need for post insulator 52.

Figure 6:
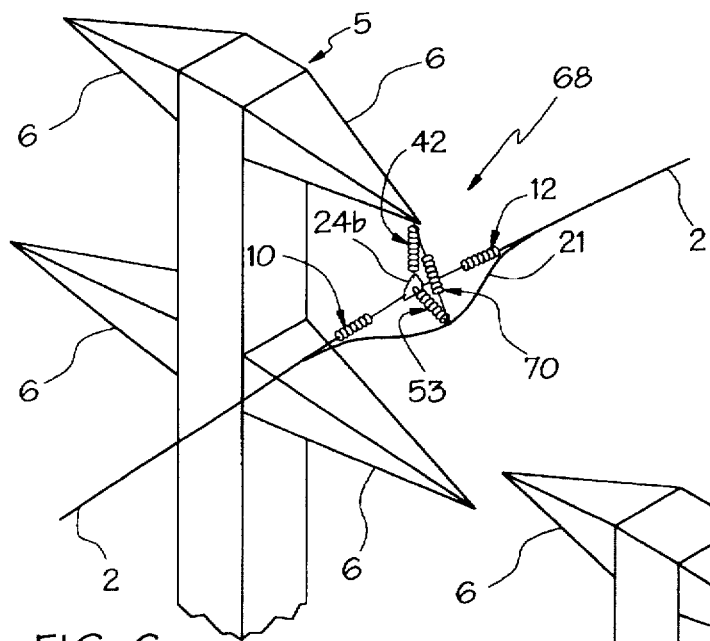
FIG. 6 is a diagrammatic perspective view of a third embodiment of the method and apparatus of the present invention.

A third embodiment of the present invention is shown in FIG. 6 and is indicated generally at 68. Apparatus 68 is similar to apparatus 1 of FIG. 1 and includes insulator strings 10 and 12, a yoke plate 24b which is generally similar to yoke plate 24, vertical insulator string 42 and a pivotally mounted solid line post insulator 53. Apparatus 68 further includes a tension insulator string 70 which extends between arm 6 of support structure 5 and conductor clamp 58 of pivoting line post insulator 53. Tension insulator string 70 is similar in construction to insulator strings 10 and 12. Insulator string 70 assists the pivotally mounted line post insulator 53 and insulator 42 in mounting loop 21 in its desired position to maintain the separation from the adjacent structure.

Figure 7:
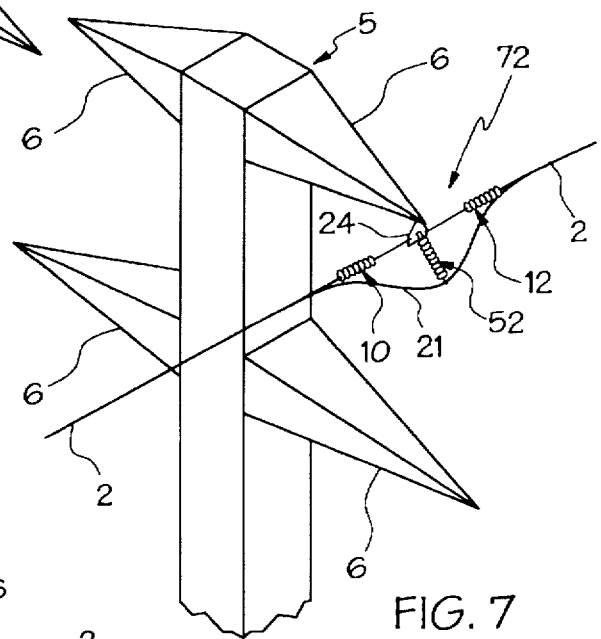
FIG. 7 is a diagrammatic perspective view of a fourth embodiment of the method and apparatus of the present invention.

A fourth embodiment of the present invention is shown in FIG. 7, and is indicated generally at 72. Apparatus 72 is generally similar to apparatus 1 of FIG. 1 and includes first and second insulator strings 10 and 12, yoke plate 24 and line post insulator 52. Apparatus 72 is free of vertical insulator string 42, with yoke plate 24 being directly attached to arm 6 of support structure 5 by a pair of commercially available shackles. The omission of vertical insulator string 42, as is present on existing strain towers, allows apparatus 72 to further increase the conductor to ground clearance by raising conductor 2 between adjacent support structures 5. First and second insulator strings 10 and 12 and line post insulator 52 attach to yoke plate 24 in the same manner as that of apparatus 1.

The method and apparatus of FIGS. 1 and 5, without vertical string 42, and the arrangement shown in FIG. 7, can be applied to existing strain or dead-end towers in order to achieve the same results discussed above.

It is understood that if suspension insulator string 8 (FIG. 8) matches the specification required by apparatus 1, suspension insulator string 8 may be used in place of vertical insulator string 42. Conductor 2 is unclamped from the suspension clamp and the suspension clamp is removed from suspension insulator 8. Socket Y-clevis 44 is attached to the bottom of insulator 8 and yoke plate 24 is mounted thereto. First and second insulator strings 10 and 12 are clamped to conductor 2 as described above.

Accordingly, apparatuses 1, 64,68 and 72 include first and second insulator strings 10 and 12, respectively, which attach at first ends 20 to conductor 2 forming conductor upgrade loop 21 therebetween. Additionally, insulator strings 10 and 12 dead end conductor 2 on respective sides of support structure 5 using dead end strain clamps 18, decreasing the catenary length of conductor 2 between adjacent support structures which, in turn, increases the conductor to ground clearance. Further, strings 10 and 12 extend substantially in-line with conductor 2 and the conductor applies a substantially equal outward tension on each of the insulator strings. Also, line post insulator 52 of apparatuses 1 and 72 and pivoting line post insulator 53 of apparatus 68 holds conductor loop 21 outwardly away from support structure 5 and increases the clearance therebetween. Moreover, apparatus 1 and particularly upgrade loop 21, can be used on double circuit and single circuit configurations having a vertical phase arrangement and on some single circuit configurations having a horizontal phase arrangement. Furthermore, the apparatuses combine standard hardware utilized by those skilled in the electrical conductor art in a novel configuration.

Accordingly, the improved apparatus and method for increasing electrical clearances and insulation lengths on power line structures are simplified, provide an effective, safe, inexpensive, and efficient device which achieves all the enumerated objectives, provides for eliminating difficulties and costs encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved apparatus and method for increasing electrical clearances and insulation lengths on power line structures is constructed and used, the characteristics of the construction, the advantageous, cost effective, and new and useful results obtained, the new and useful structures, devices, elements, arrangements, parts, combinations and method steps are set forth in the appended claims.

We claim:

1. An apparatus for increasing electrical conductor clearances from a grounded support structure, ground and underlying objects, said apparatus including:

first and second insulators dead-end clamped at first ends to the electrical conductor and extending substantially in line with said conductor, a section of said conductor forming an outwardly extending upgrade loop between the first ends of said first and second insulators;

attachment means for mounting said first and second insulators on the support structure at second ends of the insulators;

insulator means for insulating the attachment means from said grounded support structure; and a third insulator adapted to extend from the insulated attachment means for maintaining the upgrade loop a predetermined distance from the grounded support structure.

2. The apparatus defined in claim 1 in which the first and second insulators are string insulators pivotally attached to the insulated attachment means, each of said first and second insulators including a plurality of interconnected disk insulators.

3. The apparatus defined in claim 2 in which the attachment means includes a plate attached to the second ends of the insulators.

4. The apparatus defined in claim 3 in which the third insulator is a rigid post insulator attached to the plate and extending between said plate and the upgrade loop.

5. The apparatus defined in claim 3 in which the insulator means is a string insulator which extends between the plate and the support structure.

6. The apparatus defined in claim 5 in which the third insulator is a post insulator rigidly attached to the plate and extending between said plate and the upgrade loop.

7. The apparatus defined in claim 6 which further includes a fourth insulator adapted to extend between the support structure and the upgrade loop.

8. The apparatus defined in claim 3 in which the plate is a triangular-shaped yoke plate.

9. The apparatus defined in claim 1 in which the third insulator is a rigid post insulator extending between said attachment means and the upgrade loop; and in which the insulator means is a string insulator adapted to extend between the support structure and the attachment means.

10. The apparatus defined in claim 1 in which the third insulator is a rigid post insulator extending between the attachment means and the upgrade loop.

11. The apparatus defined in claim 1 in which the third insulator is a post insulator adapted to extend between the attachment means and the upgrade loop; in which the insulator means is a string insulator adapted to extend between the support structure and the attachment means; and further including a fourth insulator which is a string insulator adapted to extend between the support structure and the upgrade loop.

12. In combination, a support structure for supporting an electrical conductor and an apparatus mounted on said support structure for increasing electrical clearances between said electrical conductor and said support structure and underlying objects, said apparatus including first and second insulators dead-end clamped at first ends to the electrical conductor forming an upgrade loop between the first ends of said first and second insulators, said upgrade loop extends outwardly away from said support structure; attachment means for mounting said first and second insulators on the support structure at second ends of the insulators; insulator means for insulating the attachment means from the support structure; and a third insulator extending from the attachment means for maintaining the upgrade loop a predetermined distance from the support structure.

13. The combination defined in claim 12 in which the insulator means is a string insulator extending between the support structure and the attachment means.

14. The combination defined in claim 13 in which the third insulator is a rigid post insulator extending between said attachment means and the upgrade loop.

15. The combination defined in claim 12 in which the third insulator is a rigid post insulator extending between the attachment means and the upgrade loop.

16. The combination defined in claim 14 in which a fourth insulator which is a string insulator extends between the support structure and the upgrade loop.

17. A method for upgrading an electrical conductor mounted on and extending between spaced support structures, said method including the steps of:

disconnecting the conductor from one of the support structures;

mounting attachment means to a vertical insulator string, said vertical insulator string being attached to said one support structure to insulate the attachment means therefrom;

attaching first and second insulator strings to said insulated attachment means;

dead-ending the conductor at spaced locations to the first and second insulator strings on opposite sides of the attachment means to form a conductor loop extending between said first and second insulator strings; and attaching a third insulator between the insulated attachment means and the conductor loop, said third insulator being insulated from the one support structure by the attachment means.

18. The method defined in claim 17 further including the step of attaching the vertical insulator string between said one support structure and the attachment means.

19. The method defined in claim 17 further including the step of attaching a fourth insulator string between said one support structure and the conductor loop.

20. The method defined in claim 17 in which the step of disconnecting the conductor from one of the support structures further includes the step of disconnecting the conductor from the vertical insulator string, said vertical insulator string being previously mounted to said one support structure; and further including the step of attaching the attachment means to said vertical insulator string.

21. An apparatus for increasing electrical conductor clearances from a grounded support structure, ground and underlying objects, said apparatus including:

first and second insulators dead-end clamped at first ends to the electrical conductor and extending substantially in line with said conductor, a section of said conductor forming an outwardly extending upgrade loop between the first ends of said first and second insulators;

attachment means for mounting said first and second insulators on the support structure at second ends of the insulators; and a third insulator adapted to extend between the grounded support structure and the attachment means for insulating the attachment means from said grounded support structure, said third insulator vertically supports and insulates the attachment means, the first and second insulators and the conductor and upgrade loop from the grounded support structure.

* * * * *